United States Patent Office 3,350,883
Patented Nov. 7, 1967

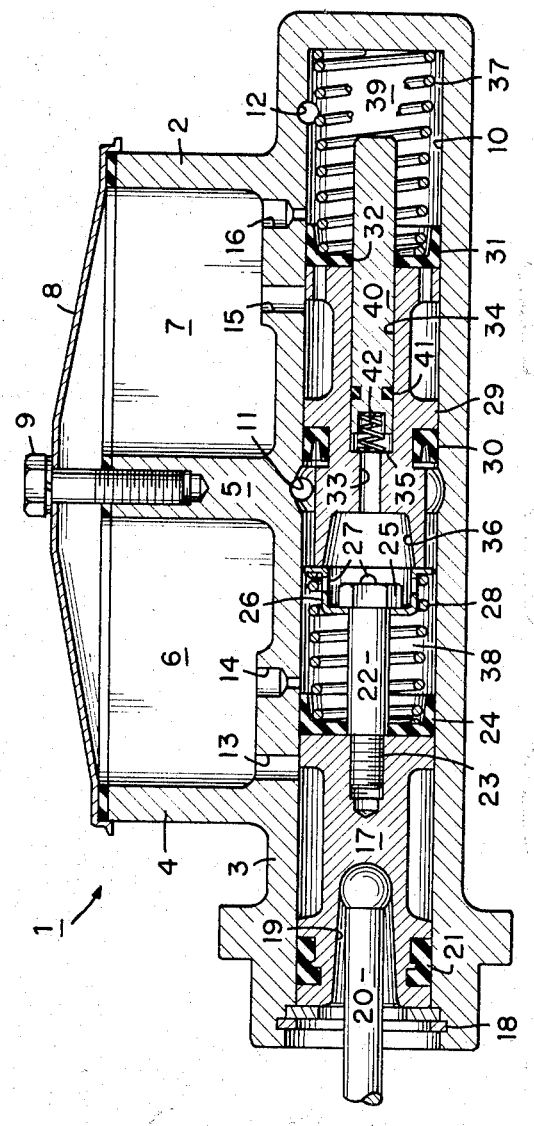

3,350,883
TANDEM MASTER CYLINDER
John H. Rohlfs, Berkeley, Mo., assignor, by mesne assignments, to Wagner Electric Corporation, a corporation of Delaware
Filed Jan. 26, 1966, Ser. No. 523,212
9 Claims. (Cl. 60—54.6)

This invention relates to fluid pressure systems and more particularly to a tandem master cylinder for use in a dual fluid pressure system.

The principal object of the present invention is to provide a tandem master cylinder with means therein for automatically establishing fluid pressures in the separate branches of a dual fluid pressure system which are substantially equal.

Another object of the present invention is to provide a tandem master cylinder having a pair of fluid pressure generating pistons therein, and a floating piston movable in one of said fluid pressure generating pistons to a position maintaining the established fluid pressure to the separate branches of the dual fluid pressure system substantially equal.

Another object of the present invention is to provide a tandem master cylinder having a first piston member movable in the bore of said master cylinder, and a second piston member movable in said bore independently of said first piston member and defining therewith a pair of pressure fluid chambers, said first piston member being movable in response to an applied force to establish fluid pressure in one of said chambers, and said second piston member being movable in response to the established fluid pressure in said one chamber to establish fluid pressure in said other chamber, and an equalizing piston movable in said second piston member in response to the established fluid pressures in said one and other chambers for maintaining the magnitudes thereof substantially equal.

Still another object of the present invention is to provide a tandem master cylinder having a bore with a pair of fluid pressure generating pistons movable therein and defining a first pressure fluid chamber therebetween and a second pressure fluid chamber between one of said pistons and the end wall of said bore, and an equalizing piston movable in said one piston for maintaining the fluid pressures in said first and second pressure fluid chambers substantially equal and also being engageable with said end wall to serve as a stop and limit movement of said one piston in the event of fluid pressure failure in said second chamber.

Still another object of the present invention is to provide a tandem master cylinder of simplified construction and economy of manufacture.

Briefly, the present invention comprises a tandem master cylinder having a pair of fluid pressure generating means therein and defining a pair of fluid pressure chambers, one of said fluid pressure generating means being responsive to an applied force to establish fluid pressure in one of said chambers, and the other of said fluid pressure generating means being responsive to the established fluid pressure in said one chamber to establish fluid pressure in the other of said chambers, and means in said other fluid pressure generating means for maintaining the fluid pressures in said one and other fluid pressure chambers substantially equal.

These and other objects and advantageous features will become apparent hereinafter by referring to the specification and the accompanying drawing which is a cross-sectional view of a tandem master cylinder embodying the present invention.

A tandem master cylinder or fluid pressure generating means 1 is provided with a housing 2 having integrally formed cylinder and reservoir portions 3, 4 therein. A transversely extending wall 5 is integrally provided on the housing 2 separating the reservoir portion 4 into divided pressure fluid reservoir or sump chambers 6, 7, and a closure assembly 8 is secured in place on said reservoir portion by a bolt 9 which is threadedly received in the wall 5 to prevent the entry of foreign particles into said sump chambers.

The cylinder portion 3 is provided with an axially aligned bore 10 which is closed on its rightward end by the housing 2 and outlet ports 11, 12 are provided in said housing intersecting with said bore adjacent to the mid-portion thereof and adjacent to the rightward end wall, respectively. Axially spaced supply and compensation ports 13, 14 are provided in the housing 2 connected between the sump chamber 6 and the housing bore 10 leftwardly of the outlet port 11, and axially spaced supply and compensation ports 15, 16 are provided in said housing connected between the sump chamber 7 and said housing bore 10 between the outlet ports 11, 12.

A fluid pressure generating piston 17 is slidably received in the housing bore 10 and retained against displacement therefrom by a snap ring and groove assembly 18 provided adjacent to the leftward end of said housing bore, and an axially extending recess 19 is provided in the leftward end of said piston to pivotally receive the driving end of an operator controlled push rod 20. A secondary piston seal 21 is carried on the piston 17 adjacent to the leftward end thereof closing the housing bore 10, and a piston extension 22 is threadedly connected at 23 to the rightward end of said piston. A primary seal 24 is fixedly interposed or carried between the piston and extension 17, 22 and is normally in sealing engagement between the housing bore 10 and the piston 17. The extension 22 has a rightward head or abutment end 25 which extends coaxially into the bore 10, a spring retaining member 26 having a plurality of holes 27 therein for fluid flow therethrough is movable on the periphery of said extension between the rightward end of the piston 17 and the head 25. A return spring 28 is provided in concentric relation with the extension 22 and is biased between the spring retaining member 26 and the primary seal 24 normally urging said spring retaining member into engagement with the head 25 on said extension.

Another fluid pressure generating piston 29 is slidably received in the bore 10 having a seal 30 adjacent to the leftward end thereof in sealing engagement with said bore, and a sealing cup 31 having a centrally located aperture 32 therein is sealably engaged between the rightward end of said piston and said bore. A bore and counterbore 33, 34 are provided in the piston 29 and form an annular shoulder or abutment 35 at the juncture thereof, and said counterbore extends through the rightward end of said piston substantially coaxial with the aperture 32 in the sealing cup 31, and the leftward end of said bore connects with a recess 36 extending through the leftward end of said piston. A return spring 37 is biased between the rightward end wall of the housing 2 and the sealing cup 31 normally urging the leftward end of said piston into abutting engagement with the spring retaining member 26. It should be noticed that a fluid pressure generating chamber 38 is defined in the housing bore 10 between the primary seal 24 on the piston 17 and the seal 30 on the piston 29 in open pressure fluid communication with the outlet port 11 and normally connected with the sump chamber 6 through the compensating port 14 and that another fluid pressure generating chamber 39 is defined in the housing bore 10 between the sealing cup 31 on the piston 29 and the rightward end wall of the housing 2 in open pressure fluid communication with the outlet port 12 and normally connected with the sump chamber 7 through the compensating port 16.

A third or equalizing piston member 40 is slidably received in the counterbore 34 and extends into the chamber 39, and an O-ring 41 provided on the periphery of said piston adjacent to the leftward end thereof sealably engages said counterbore. The opposed ends of the piston 40 are in open pressure fluid communication with the fluid pressure generating chambers 38, 39 and respectively responsive to the established fluid pressures therein, and a spring 42 is provided in the counterbore 34 biased between the annular shoulder 35 and the leftward end of the piston 40 normally urging said piston rightwardly.

In the normal operation of the tandem master cylinder 1 with the component parts in their original positions, as shown in the drawings and as hereinbefore described, a manually applied force to the push rod 20 moves the piston 17 rightwardly to close the compensating port 14 and establish fluid pressure in the chamber 38 which is displaced through the outlet port 11 to one of the branches of the dual fluid pressure system (not shown). The established fluid pressure in the chamber 38 is also effective on the leftward end of the piston 29 to move said piston rightwardly and close the compensating port 16 substantially simultaneously with the closing of the compensating port 14. This rightward movement of the piston 29 serves to establish fluid pressure in the chamber 39 which is displaced through the outlet port 12 to the other branch of the dual fluid pressure system (not shown), substantially simultaneously with the delivery of fluid pressure to the branch connected with the outlet port 11. Although the opposed end areas of the piston 29 responsive to fluid pressure in the chambers 38, 39 are equal, the established fluid pressure in the chamber 39 will be less than the established fluid pressure in the chamber 38 due to frictional losses caused by the seal 30 and cup 31 on said piston engaging the bore 10. Since the rightward end of the piston 40 extends into the chamber 39 and the leftward end of said piston is in pressure fluid communication with the chamber 38 through the recess 36 and bore 33, said piston reciprocates in the counterbore 34 in response to the fluid pressure in said chambers acting on the opposed ends thereof. Due to the small fluid pressure responsive areas on the piston 40 and the low frictional effect created by the O-ring 41 engaging the counterbore 34, said piston moves to increase the fluid pressure in one of the chambers while decreasing the fluid pressure in the other chamber and substantially equalizes or balances the magnitudes of the established fluid pressures in said chambers acting on the opposed ends thereof.

When the desired braking effect is obtained, the manually applied force is removed from the push rod 20, and the displaced pressure fluid is returned to the chambers 38, 39 and the pistons 17 and 29 are returned to their original positions by the springs 28 and 37, respectively. As the manually applied force is removed, a partial vacuum may be momentarily created in the chambers 38, 39, and the flow of pressure fluid from the sump chambers 6, 7 through the supply ports 13 and 16 to the bore 10 between the seals 21 and 24 on the piston 17 and between the seals 30 and 31 on the piston 29, respectively, flows past the collapsed lips of the cups 24 and 31 due to the partial vacuum to accomplish pressure fluid compensation in the chambers 38, 39.

It should be understood that the brakes connected with one branch of the dual fluid pressure system will remain operative and will be effective to establish a safe braking of the vehicle if the other branch of the fluid pressure system fails, and the operator will be aware of the defective branch due to the increased pedal stroke necessary to effect the braking application.

In the event of a leak in the fluid pressure branch connected with the outlet port 11, the applied force on the push rod 20 will move the piston 17 rightwardly and abuttingly engage the extension 22 with the leftward end of the piston 29 to mechanically drive the piston 29 rightwardly to close the compensating port 16 and establish fluid pressure in the chamber 39 which is displaced through the outlet port 12 to effect a safe braking of the vehicle. Since there is no fluid pressure in the chamber 38 to act on the leftward end of the equalizing piston 40, said piston moves leftwardly to engage the annular shoulder 35 and is held in its inoperative position by the fluid pressure in the chamber 39 acting on the rightward end of said piston.

In the event of a leak in the fluid pressure branch connected with the outlet port 12, the applied force on the push rod 20 moves the piston rightwardly to close the compensating port 14 and establish fluid pressure in the chamber 38 which is displaced through the outlet port 11 into the branch of the dual fluid pressure system connected thereto. As the established fluid pressure in the chamber 38 acts on the leftward ends of the pistons 29 and 40 to urge them rightwardly, there is no fluid pressure established in the chamber 39 to resist this rightward movement, and the rightward end of the piston 40 abuttingly engages the rightward end wall of the housing 2 and the piston 29 moves rightwardly to abuttingly engage the annular shoulder 35 with the leftward end of the piston 40 serving to limit the further rightward movement of the piston 29. The piston 29 thereby serves as a fixed rightward end of the chamber 38 and the seals 30 and 41 prevent pressure fluid flow from the chamber 38 to the chamber 39, so that the applied force to the push rod 20 will continue to establish fluid pressure in the chamber 38 and effect a safe braking of the vehicle.

From the foregoing, it is now apparent that a novel tandem master cylinder meeting the objects set out hereinbefore is provided and that changes or modifications as to the precise configurations, shapes and details of the construction set forth in the disclosure by way of illustration may be made by those skilled in the art without departing from the spirit of the invention, as defined by the claims which follow.

The embodiments of the invention in which an exclusive property or privilege is claimed are defined as follows:

1. A tandem master cylinder comprising a housing, a pair of fluid pressure generating means movable in said housing and defining therewith a pair of fluid pressure chambers, one of said fluid pressure generating means being movable in response to an applied force to establish fluid pressure in one of said chambers, the other of said fluid pressure generating means being movable in response to the established fluid pressure in said one chamber to establish another fluid pressure in the other of said chambers, and equalizing means movable in said other fluid pressure generating means between said one and other chambers in response to the first named and other established fluid pressures to substantially equalize the magnitudes thereof.

2. The tandem master cylinder according to claim 1, comprising a bore in said other fluid pressure generating means having opposed ends connected with said one and other chambers, said equalizing means being movable in said bore and having opposed surfaces thereon respectively responsive to the established fluid pressures in said one and other chambers.

3. The tandem master cylinder according to claim 1, wherein said equalizing means includes piston means movable in said other fluid pressure generating means and having opposed ends respectively responsive to the established fluid pressures in said one and other chambers.

4. The tandem master cylinder according to claim 3, comprising a bore in said other fluid pressure generating means having opposed ends connected with said one and other chambers, said piston means being slidable in said bore.

5. The tandem master cylinder according to claim 4, comprising an end wall in said housing defining with said other fluid pressure generating means said other chamber, one end of said piston means extending into said other chamber for abutting engagement with said end wall, abutment means in said bore for engagement with the other end of said piston means, the movement of said other fluid pressure generating means being predeterminately limited in the event of fluid pressure failure in said other chamber upon the engagement of said abutment means with said piston means other end and the engagement of said piston means one end with said end wall.

6. The tandem master cylinder according to claim 3, comprising an end wall in said housing defining with said other fluid pressure generating means said other chamber, a bore and counterbore in said other fluid pressure generating means extending therethrough and connected with said one and other chambers, respectively, an annular shoulder defined at the juncture of said bore and counterbore for engagement with one end of said piston means, the other end of said piston means extending into said other chamber for abutting engagement with said end wall, said piston means being movable in response to the established fluid pressure in said one chamber acting on said piston means one end toward a position engaging said piston means other end with said end wall, and said other fluid pressure generating means also being movable in response to the established fluid pressure in said one chamber toward a position engaging said annular shoulder with said piston means one end to limit the movement of said other fluid pressure generating means upon the failure of established fluid pressure in said other chamber.

7. The tandem master cylinder according to claim 1, including a pressure fluid reservoir in said housing having a pair of separate sump chambers, one of said sump chambers being normally connected in pressure fluid communication with said one fluid pressure chamber, the other of said sump chambers being normally connected in pressure fluid communication with said other fluid pressure chamber, said first fluid pressure generating means being movable in response to the applied force toward a position interrupting pressure fluid communication between said one sump chamber and said one fluid pressure chamber, and said other fluid pressure generating means being movable in response to the established fluid pressure in said one fluid pressure chamber toward a position interrupting pressure fluid communication between said other sump chamber and said other fluid pressure chamber.

8. The tandem master cylinder according to claim 1, including a pressure fluid reservoir in said housing having a pair of separate sump chambers, passage means in said housing normally connecting one of said sump chambers in pressure fluid communication with said one fluid pressure chamber, and other passage means in said housing normally connecting the other of said sump chambers in pressure fluid communication with said other fluid pressure chamber, sealing means on said one fluid pressure generating means being movable in response to the applied force toward a position closing said first named passage means, and other sealing means on said other fluid pressure generating means being movable in response to the established fluid pressure in said one chamber toward a position closing said other passage means.

9. The tandem master cylinder according to claim 1, wherein said one and other fluid pressure generating means are movable in said housing and define therebetween said one fluid pressure chamber, driving means on said one fluid pressure generating means extending into said one fluid pressure chamber for engagement with said other fluid pressure generating means, said one fluid pressure generating means being movable in response to the applied force to engage said driving means with said other fluid pressure generating means and mechanically drive said other fluid pressure generating means toward a position establishing fluid pressure in said other chamber upon the failure of established fluid pressure in said one chamber.

No references cited.

MARTIN P. SCHWADRON, *Primary Examiner.*

R. R. BUNEVICH, *Assistant Examiner.*